(12) United States Patent
Vandermolen

(10) Patent No.: US 10,981,627 B2
(45) Date of Patent: *Apr. 20, 2021

(54) INTEGRATED CONTROL DEVICE AND INTEGRATED HANDLEBAR FOR BICYCLE

(71) Applicant: TIEN HSIN INDUSTRIES CO., LTD., Taichung (TW)

(72) Inventor: Mark Vandermolen, Taichung (TW)

(73) Assignee: TIEN HSIN INDUSTRIES CO., LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/935,456

(22) Filed: Jul. 22, 2020

(65) Prior Publication Data

US 2020/0346709 A1 Nov. 5, 2020

Related U.S. Application Data

(63) Continuation-in-part of application No. 15/870,200, filed on Jan. 12, 2018, now Pat. No. 10,759,495.

(51) Int. Cl.
| | |
|---|---|
| *B62M 25/04* | (2006.01) |
| *B62K 23/02* | (2006.01) |
| *B60T 7/08* | (2006.01) |
| *B62K 21/12* | (2006.01) |
| *B62L 3/02* | (2006.01) |
| *B62K 23/06* | (2006.01) |
| *B62M 25/08* | (2006.01) |
| *B60T 7/10* | (2006.01) |

(52) U.S. Cl.
CPC ............ *B62M 25/04* (2013.01); *B60T 7/085* (2013.01); *B60T 7/102* (2013.01); *B62K 23/06* (2013.01); *B62L 3/02* (2013.01); *B62M 25/08* (2013.01); *B60T 7/08* (2013.01); *B62K 21/125* (2013.01)

(58) Field of Classification Search
CPC ... B60T 7/08; B60T 7/10; B60T 7/107; B60T 7/085; B60T 7/102; B62K 21/12; B62K 21/125; B62K 23/06; B62L 3/02; B62M 25/04; B62M 25/045; B62M 25/08
See application file for complete search history.

(56) References Cited

U.S. PATENT DOCUMENTS 10,759,495 B2 * 9/2020 Vandermolen ....... B62K 21/125

* cited by examiner

*Primary Examiner* — Adam D Rogers
(74) *Attorney, Agent, or Firm* — Tracy M. Heims; Apex Juris, PLLC.

(57) ABSTRACT

An integrated handlebar for a bicycle includes a handlebar and at least one integrated control device, wherein the handlebar has at least two free ends and the integrated control device includes a base engaged with at least one of the free ends, a brake lever and an electronic controller. The brake lever has a front end pivotally connected with the base and a rear end. The brake lever has a mounting portion, being located at a distance not greater than ¾ length of the brake lever from the rear end and not on the rear end. The electronic controller includes an operation member disposed on the brake lever, which includes at least one operation part adapted to be triggered by fingers of a rider to control an action of the operation member so as to drive the electronic controller to output an electronic signal to an electronic component.

10 Claims, 12 Drawing Sheets

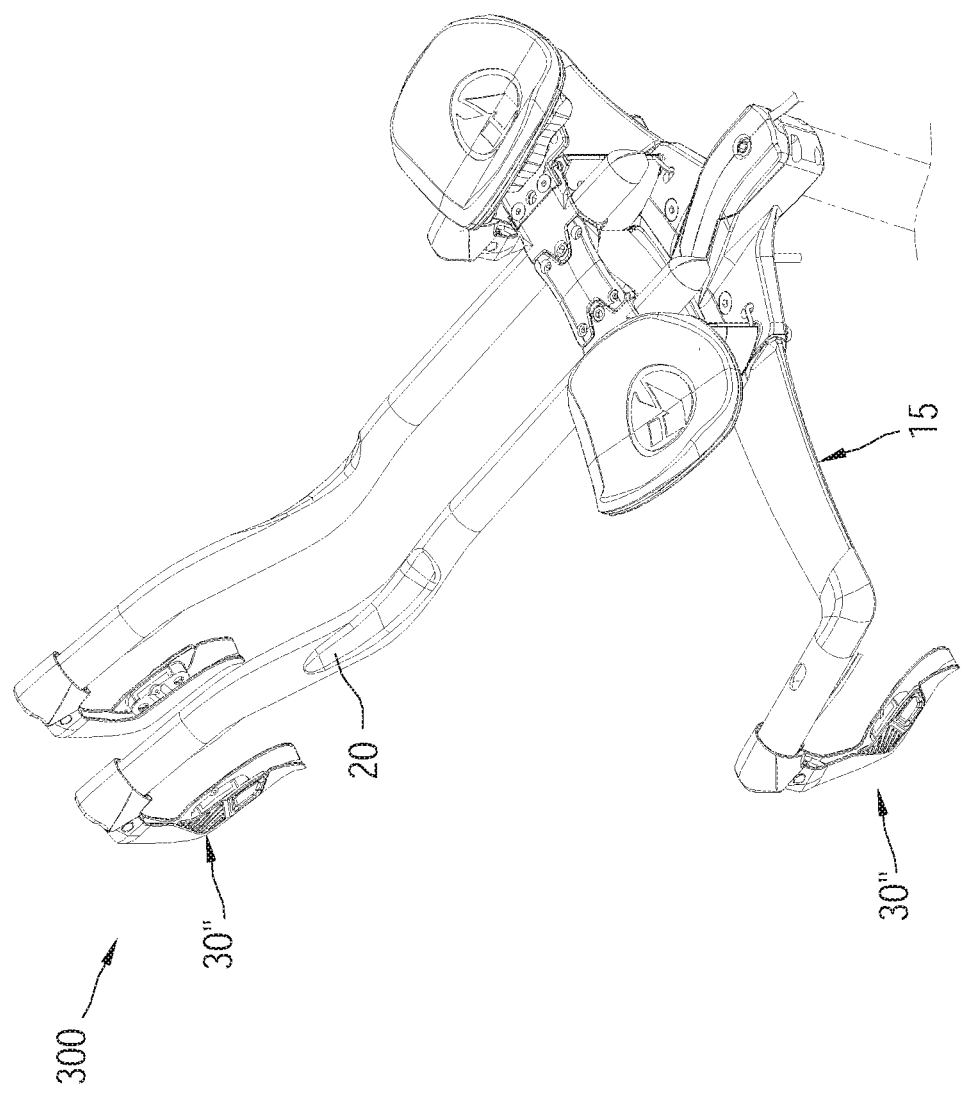

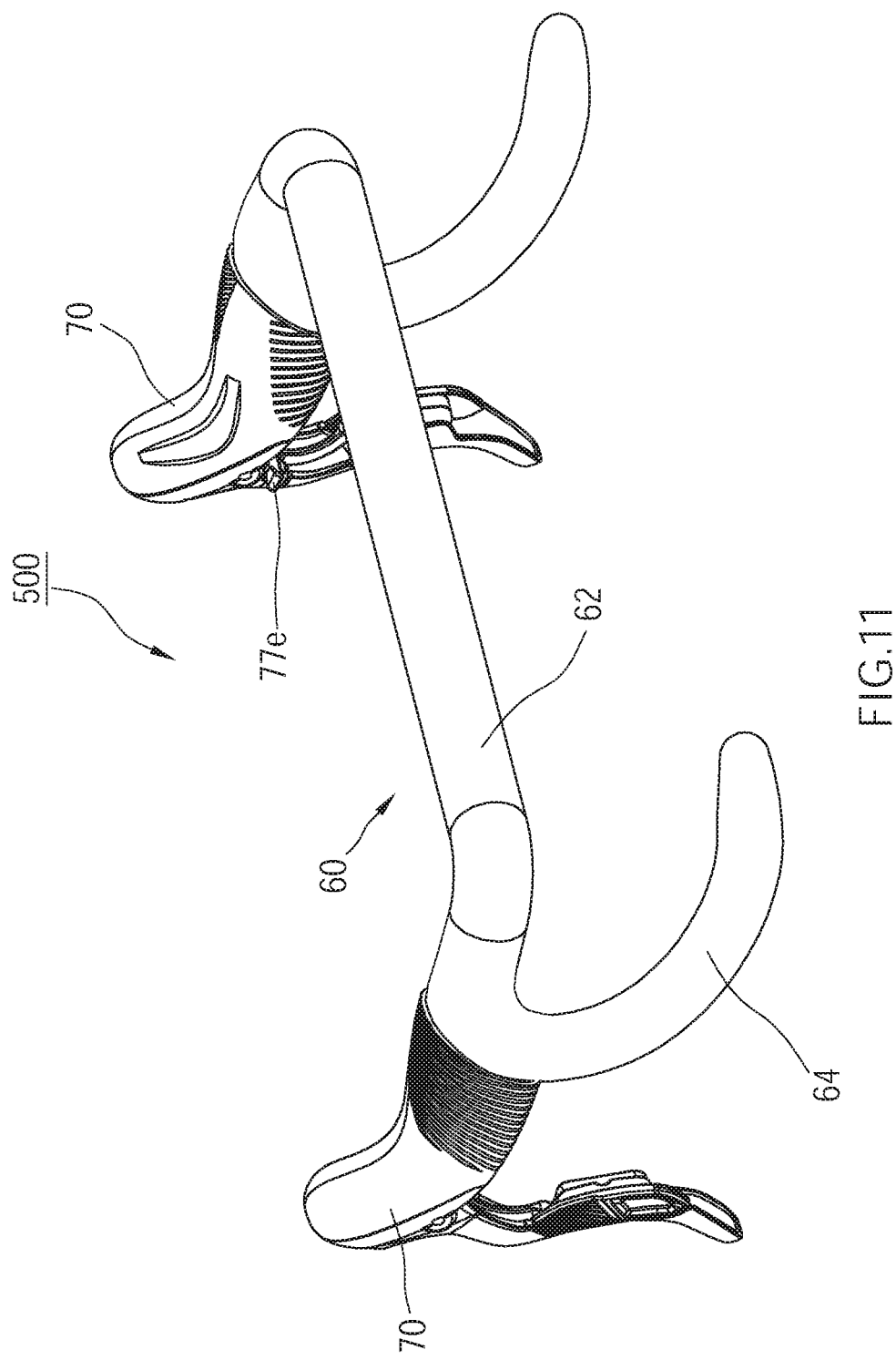

INTEGRATED CONTROL DEVICE AND INTEGRATED HANDLEBAR FOR BICYCLE

BACKGROUND OF THE INVENTION

1. Technical Field

The present disclosure relates to a control device and a handlebar for a bicycle, and more particularly to an integrated control device and an integrated handlebar for a bicycle which is ergonomically designed and convenient to operate.

2. Description of Related Art

In bicycle races, speed is one of the most important factors in performance evaluation. In order to increase the riding speed, bicycle manufacturers are implementing various improvements in the design of bicycle, such as reducing weight, lowering of wheel rolling resistance, increasing derailleur speed, and facilitating the operation for various bicycle devices.

Handlebar extensions, which are also called rest handlebars, are commonly used as an extension structure of handlebar in a triathlon competition. The handlebar extension includes a main handlebar, two auxiliary handlebars and two pads, wherein, the two auxiliary handlebars are disposed to a middle section of the main handlebar and extended parallel and forwardly, and the two pads are respectively located at the two sides around the bases of the two auxiliary handlebars. A rider could lean over and rest his arms or elbows on the two pads to have his upper body weight being received thereon, thereby reducing a weight loading on his waist in a long-time riding. Besides, by using the two auxiliary handlebars, the rider is able to lower his upper body, so as to reduce the wind resistance, and thereby saving his energy and increasing the riding speed. Meanwhile, the two auxiliary handlebars are adapted to be held by the rider to control the riding direction. A stem is fixed with the middle portion of the main handlebar and engaged with a head tube of the bicycle. A front and a rear brake control are respectively installed to the two sides of the main handlebar, in order to decelerate the riding speed.

In the past, brake controls and other kinds of controllers, such as gear shifting controls, are respectively installed on the main handlebar, wherein the relative positions between the brake control devices and the other kinds of controllers affect the timing for the rider to reach the controllers, which is a key point in the cycling competition.

BRIEF SUMMARY OF THE INVENTION

In view of abovementioned, the main purpose of the present disclosure is to provide an integrated control device and an integrated handlebar which is ergonomically designed and convenient to operate, so as to enable a rider to adjust the control device according to road condition immediately.

The present disclosure provides an integrated control device for a bicycle, adapted to be installed on a handlebar of the bicycle which has at least two free ends. The integrated control device includes: a base, adapted to be engaged with one of the two free ends of the handlebar; a brake lever, having a front end and a rear end, wherein the front end of the brake lever is pivotally connected with the base to make the brake lever pivot relative to the base, which facilitates a rider to brake the bicycle by withholding the brake lever with his fingers; the brake lever has an mounting portion, being located between the rear end and a site not greater than ¾ length of the brake lever from the rear end and not on the rear end; and an electronic controller, disposed at the brake lever and having an operation member, wherein the operation member is located in the mounting portion and has at least one operation part adapted to be triggered by the fingers of the rider to control an action of the operation member so as to make the electronic controller output an electronic signal to an electronic component and control an action of the electronic component; wherein the brake lever pivot relative to the handlebar substantially in one direction only.

According to an embodiment of the present disclosure, the electronic controller includes two operation parts, which are a first operation part and a second operation part; when the first operation part is triggered by the rider, the electronic controller would output the electronic signal for actuating a first action of the electronic component; when the second operation part is triggered by the rider, the electronic controller would output the electronic signal for actuating a second action of the electronic component, wherein the second action is different from the first action; at least one of the first operation part and the second operation part is located on the mounting portion at about a distance of ½ length of the brake lever from the rear end.

According to an embodiment of the present disclosure, the electronic controller includes three operation parts, which are respectively a first operation part, a second operation part, and a third operation part; when the first operation part is triggered by the rider, the electronic controller would output the electronic signal for actuating a first action of the electronic component; when the second operation part is triggered by the rider, the electronic controller would output the electronic signal for actuating a second action of the electronic component, wherein the second action is different from the first action; when the third operation part is triggered by the rider, the electronic controller would output the electronic signal for actuating a third action of the electronic component; at least one of the first operation part, the second operation part and the third operation part is located on the mounting portion at about a distance of ½ length of the brake lever from the rear end.

According to an embodiment of the present disclosure, the first operation part is located on the mounting portion at about a distance of ½ length of the brake lever from the rear end, while the second operation part is located on the mounting portion adjacent to the rear end of the brake lever.

According to an embodiment of the present disclosure, the third operation part is located on the mounting portion at about a distance of ½ length of the brake lever from the rear end, and the first operation part and the third operation part are located at two opposite sides of the brake lever.

According to an embodiment of the present disclosure, the third operation part is connected to and operated together with the first operation part or the second operation part, thereby enabling the third operation part to drive the first operation part or the second operation part simultaneously when the third operation part is triggered by the rider; the third action is identical with the first action or the second action.

According to an embodiment of the present disclosure, the first operation part, the second operation part, and the third operation part are an integrally formed structure.

According to an embodiment of the present disclosure, the third action is different from the first action and the second action.

The present disclosure also provides an integrated handlebar for a bicycle. The integrated handlebar includes a main handlebar, having a stem disposed at a middle section thereof, wherein the stem is adapted to be installed on a head tube of the bicycle, and the main handlebar has two free ends located at two sides of the stem; two auxiliary handlebars, disposed on the middle section of the main handlebar and extending forwardly with respect to the bicycle, wherein the two auxiliary handlebars are respectively located at the two sides of the stem, and each of the two auxiliary handlebars has a free end; and at least one integrated control device, includes a base, adapted to be engaged with one of the two free ends of the main handlebar or at least one free end of the two auxiliary handlebars; a brake lever, having a front end and a rear end, wherein the front end of the brake lever is pivotally connected with the base to make the brake lever pivot relative to the base, which facilitates a rider to brake the bicycle by withholding the brake lever with his fingers; the brake lever has an mounting portion, being located between the rear end and a site not greater than ¾ length of the brake lever from the rear end and not on the rear end; and an electronic controller, disposed at the brake lever and having an operation member, wherein the operation member is located in the mounting portion and has at least one operation part adapted to be triggered by the fingers of the rider to control an action of the operation member so as to make the electronic controller output an electronic signal to an electronic component and control an action of the electronic component; wherein the brake lever pivots relative to the handlebar substantially in one direction only.

According to an embodiment of the present disclosure, the electronic controller includes two operation parts, which are a first operation part and a second operation part; when the first operation part is triggered by the rider, the electronic controller would output the electronic signal for actuating a first action of the electronic component; when the second operation part is triggered by the rider, the electronic controller would output the electronic signal for actuating a second action of the electronic component, wherein the second action is different from the first action; at least one of the first operation part and the second operation part is located on the mounting portion at about a distance of ½ length of the brake lever from the rear end.

According to an embodiment of the present disclosure, the first operation part is located on the mounting portion at about a distance of ½ length of the brake lever from the rear end, while the second operation part is located on the mounting portion adjacent to the rear end of the brake lever.

According to an embodiment of the present disclosure, the electronic controller includes three operation parts, which are respectively a first operation part, a second operation part, and a third operation part; when the first operation part is triggered by the rider, the electronic controller would output the electronic signal for actuating a first action of the electronic component; when the second operation part is triggered by the rider, the electronic controller would output the electronic signal for actuating a second action of the electronic component, wherein the second action is different from the first action; when the third operation part is triggered by the rider, the electronic controller would output the electronic signal for actuating a third action of the electronic component; at least one of the first operation part, the second operation part and the third operation part is located on the mounting portion at about a distance of ½ length of the brake lever from the rear end.

According to an embodiment of the present disclosure, the first operation part is located on the mounting portion at about a distance of ½ length of the brake lever from the rear end, while the second operation part is located on the mounting portion adjacent to the rear end of the brake lever.

According to an embodiment of the present disclosure, the third operation part is located on the mounting portion at about a distance of ½ length of the brake lever from the rear end, and the first operation part and the third operation part are located at two opposite sides of the brake lever.

According to an embodiment of the present disclosure, the third operation part is connected to and operated together with the first operation part or the second operation part, thereby enabling the third operation part to drive the first operation part or the second operation part simultaneously when the third operation part is triggered by the rider; the third action is identical with the first action or the second action.

According to an embodiment of the present disclosure, the first operation part, the second operation part, and the third operation part are an integrally formed structure.

According to an embodiment of the present disclosure, the third action is different from the first action and the second action.

According to an embodiment of the present disclosure, the integrated handlebar includes two integrated control devices, and the bases of the two integrated control devices are respectively engaged with the two free ends of the main handlebar.

According to an embodiment of the present disclosure, the integrated handlebar includes two integrated control devices, and the bases of the two integrated control devices are respectively engaged with the two free ends of the auxiliary handlebars.

According to an embodiment of the present disclosure, the integrated handlebar includes four integrated control devices, and the bases of two of the integrated control devices are respectively engaged with the two free ends of the main handlebar, while the bases of the other two of the integrated control devices are respectively engaged with the two free ends of the two auxiliary handlebars.

According to an embodiment of the present disclosure, the integrated handlebar further includes an auxiliary controller having an engaging portion and at least one operation element, which are respective located at two opposite ends of the auxiliary controller; the engaging portion is adapted to be engaged with the free end of at least one of the two auxiliary handlebars to be disposed with the auxiliary controller, which has at least one operation element faces forwardly with respect to the bicycle.

According to an embodiment of the present disclosure, the integrated control device comprises a base, a brake lever and an electronic controller. The base is adapted to be mounted on a handlebar of a bicycle. The brake lever has a front end and a rear end. The front end of the brake lever is pivotally connected with the base to allow the brake lever to pivot relative to the base. The brake lever has a mounting portion located between the rear end and a site not greater than ¾ length of the brake lever from the rear end and not on the rear end. The brake lever pivots relative to the handlebar substantially in one direction only. The electronic controller has an operation member and is disposed at the mounting portion of the brake lever The operation member is located in the mounting portion and has three operation parts adapted to be triggered by fingers of a rider to control the operation member so as to make the electronic controller output an electronic signal to an electronic component and actuate the electronic component. The three operation parts are respectively a first operation part, a second operation part, and a third operation part. When the first operation part is triggered by the rider, the electronic controller outputs the electronic signal for actuating a first action of the electronic component. When the second operation part is triggered by the rider, the electronic controller outputs the electronic signal for actuating a second action of the electronic component, wherein the second action is different from the first action. When the third operation part is triggered by the rider, the electronic controller outputs the electronic signal for actuating a third action of the electronic component, wherein the third operation part is connected to and processed together with the first operation part or the second operation part, thereby enabling the third operation part to drive the first operation part or the second operation part simultaneously when the third operation part is triggered by the rider. The third action is identical to the first action or the second action.

According to an embodiment of the present disclosure, the handlebar comprises a top portion and two drop portions integrally connecting with two ends of the top portion respectively. The base of the integrated control device is mounted on one of the drop portions of the handlebar.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which

FIG. 10 is a perspective view of an integrated handlebar of a fourth embodiment according to the present disclosure.

FIG. 11 is a perspective view of an integrated handlebar of a fifth embodiment according to the present disclosure.

DETAILED DESCRIPTION OF THE INVENTION

Figure 1:
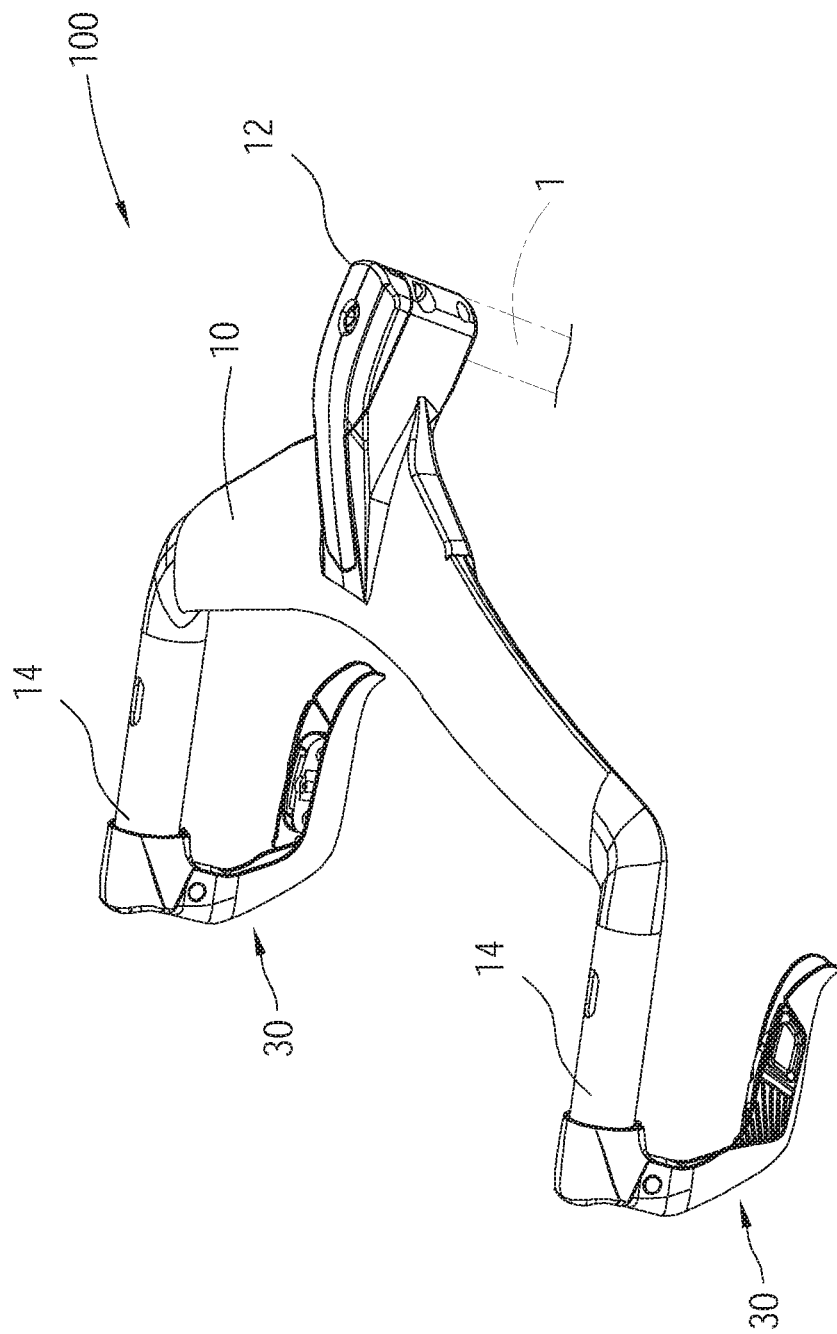
FIG. 1 is a perspective view of an integrated handlebar of a first embodiment according to the present disclosure.

The following illustrative embodiments and drawings are provided to illustrate the present disclosure, these and other advantages and effects can be clearly understood by persons skilled in the art after reading the disclosure of this specification. As shown in FIG. 1, an integrated handlebar 100 of a bicycle according to a first embodiment of the present disclosure includes a handlebar 10 and two integrated control devices 30.

The handlebar 10 includes a stem 12 on a middle section thereof. The stem 12 is adapted to be installed on a head tube 1 of a bicycle. The handlebar 10 has two free ends 14, which are disposed at two sides of the stem 12 respectively, and adapted to be held by a bicycle rider to control a riding direction.

In the current embodiment, the two integrated control devices 30 are respectively installed on the two free ends of the handlebar 10. Since the two integrated control devices 30 have the same design and are arranged symmetrically, one of the integrated control devices 30 would be explained as an example in the following description.

Figure 2:
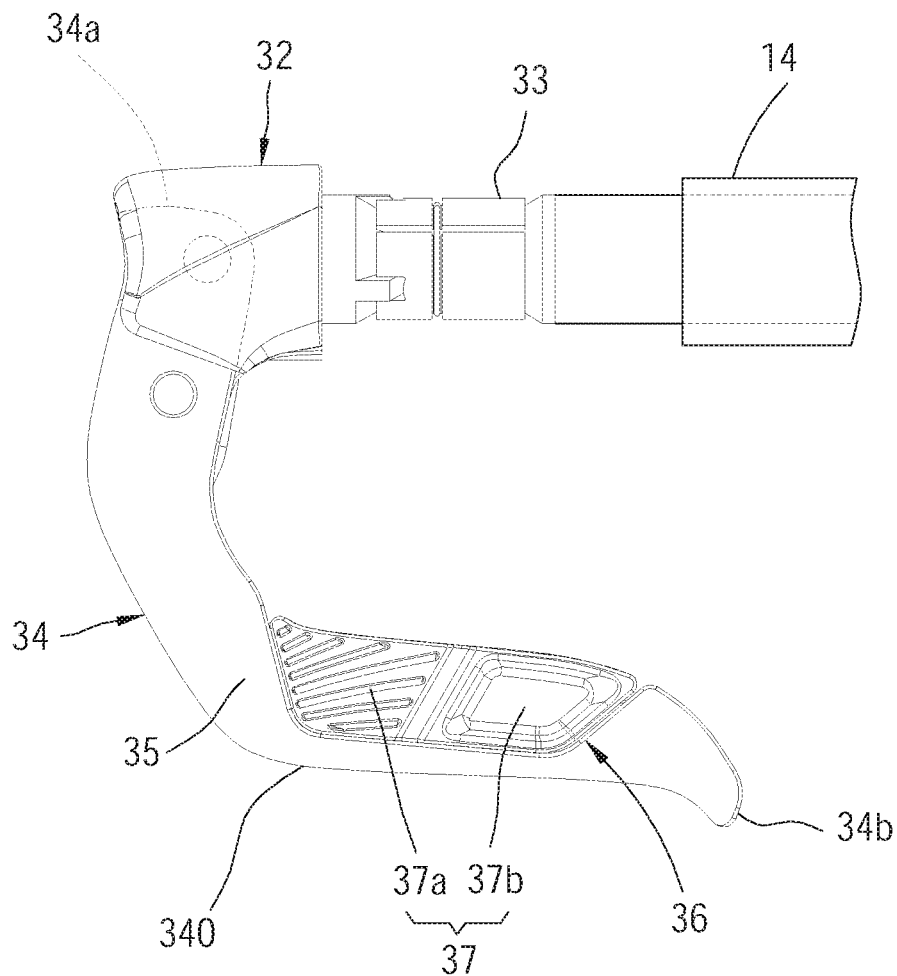
FIG. 2 is a side view of the integrated control device of the first embodiment according to the present disclosure.
Figure 3:
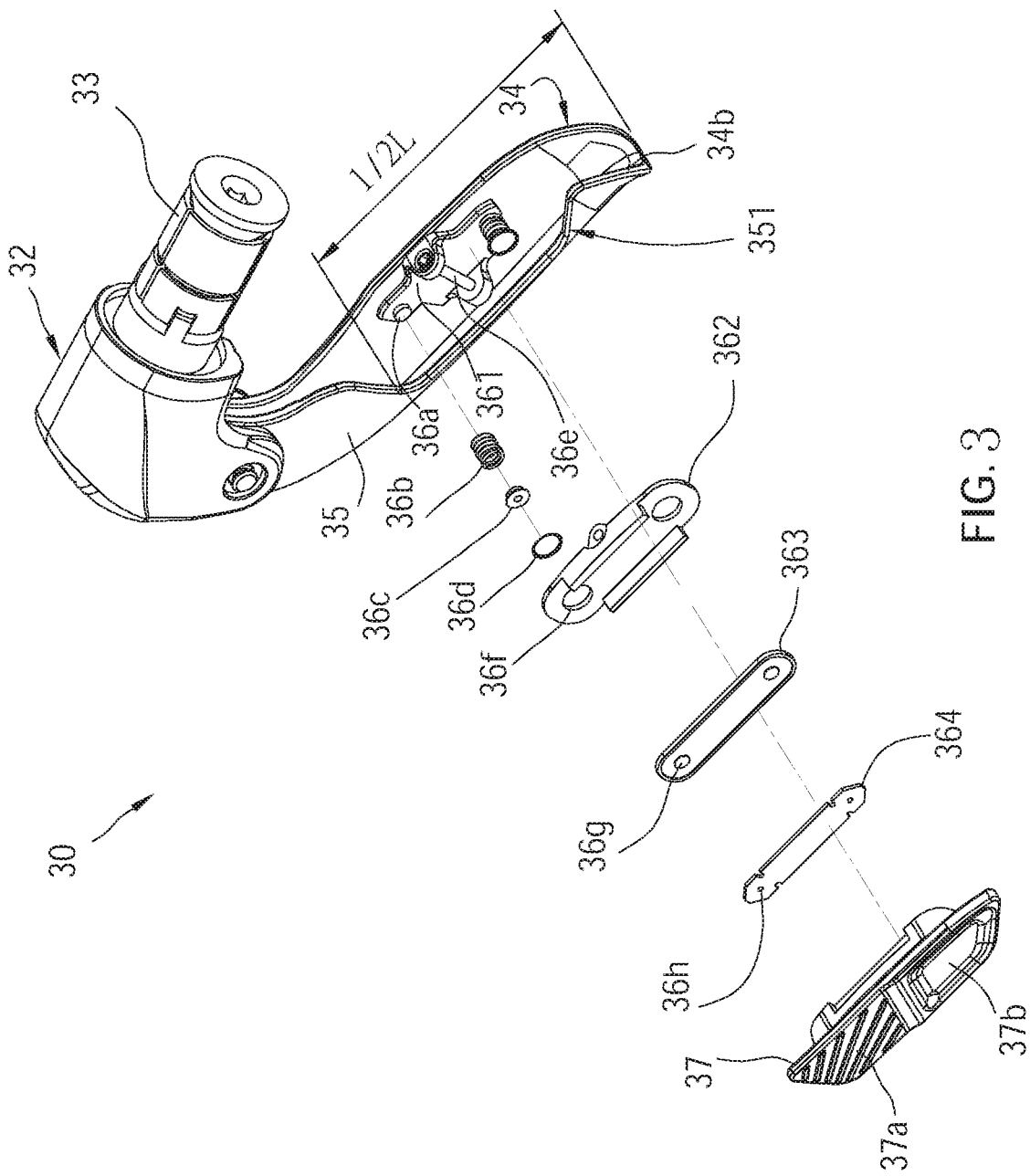
FIG. 3 is a partially exploded view of the integrated control device of the first embodiment according to the present disclosure.
Figure 4:
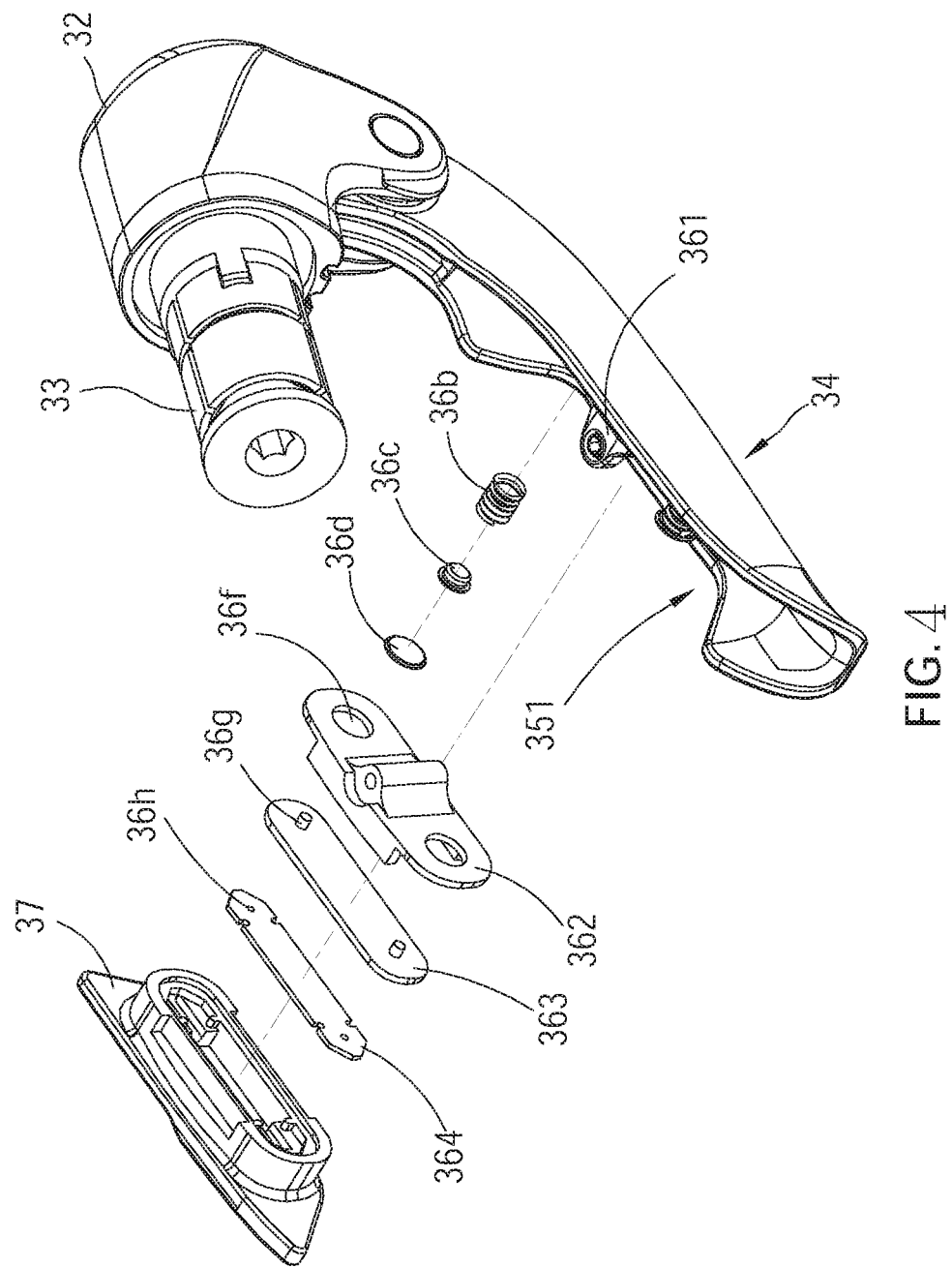
FIG. 4 is another partially exploded view of the integrated control device shown in FIG. 1 from a different angle.

As shown in FIG. 2 to FIG. 4, the integrated control device 30 includes a base 32, a brake lever 34 and an electronic controller 36.

The base 32 is adapted to be installed on the free end 14 of the handlebar 10. In the current embodiment, the handlebar 10 has a hollow structure, which includes a fixing portion 33, wherein one end of the fixing portion 33 is inserted into the free end 14 of the handlebar 10 and engaged with the handlebar 10. However, it is not limited thereto. In other embodiments, the base 32 could be engaged with the free end 14 of the handlebar 10 with other methods.

The brake lever 34 has a front end 34a and a rear end 34b which are opposite to each other. Wherein, the front end 34a of the brake lever 34 is connected to the base 32 via a pivot, thereby the brake lever 34 can be pivotally controlled corresponding to the base 32. The brake lever 34 is adapted to actuate a brake of the bicycle (not shown), whereby the rider could control the brake lever 34 with his fingers to stop or decelerate the bicycle.

Besides, the brake lever 34 includes a mounting portion 35, which is located at a distance not greater than ¾ length of the brake lever 34 from the rear end 34b, i.e., it is shown as a range of ¾ L in FIG. 2, and is not directly located on the rear end 34b. Further, in the current embodiment, the mounting portion 35 is a recess 351 disposed at a distance of ½ length of the brake lever 34 from the rear end 34b, i.e., it is shown as a range of ½ L in FIG. 3.

More detail, referring to FIG. 3, the electronic controller 36 of this embodiment is designed based on a rocker switch. The electronic controller 36 includes a base portion 361, a bottom plate 362, a sealing pad 363, a circuit board 364 and an operation member 37. The base portion 361 is disposed in the brake lever 34 toward the mounting portion 35. Wherein, each end of the base portion 361 has a protrusion 36a, each of which is engaged with a spring 36b, a button 36c and an o-ring 36d. The bottom plate 362 is pivotally connected with the base portion 361 via a pivot 36e, thereby being able to pivot corresponding to the base portion 361. The bottom plate 362 has two through holes 36f, each of which is disposed corresponding to each of the two protrusions 36a. The sealing pad 363 is disposed on one side of the bottom plate 362 which is opposite to the base portion 361, whereby the bottom plate 362 is disposed between the sealing pad 363 and the base portion 361, wherein the sealing pad 363 has two projections 36g which are fitted in the through holes 36f relatively. The circuit board 364 is disposed on the operation member 37 and has two contact portions 36h corresponding to the through holes 36f, whereby an electronic signal is sent by the circuit board 364 according to a trigger on each of the contact portions 36h.

The operation member 37 is integrally formed and fixed to the bottom plate 362 so as to make the circuit board 364 be installed between the operation member 37 and the bottom plate. In addition, the operation member 37 has a first operation part 37a and a second operation part 37b, wherein after the electronic controller 36 is installed on the brake lever 34, a shape of the operation member 37 is matched with the mounting portion 35, whereby the first operation part 37a is located on the mounting portion 35 and at about a distance of ½ length of the brake lever 34 from the rear end 34b, while the second operation part 37b is located on the mounting portion 35 adjacent to the rear end 34b of the brake lever 34.

Figure 5:
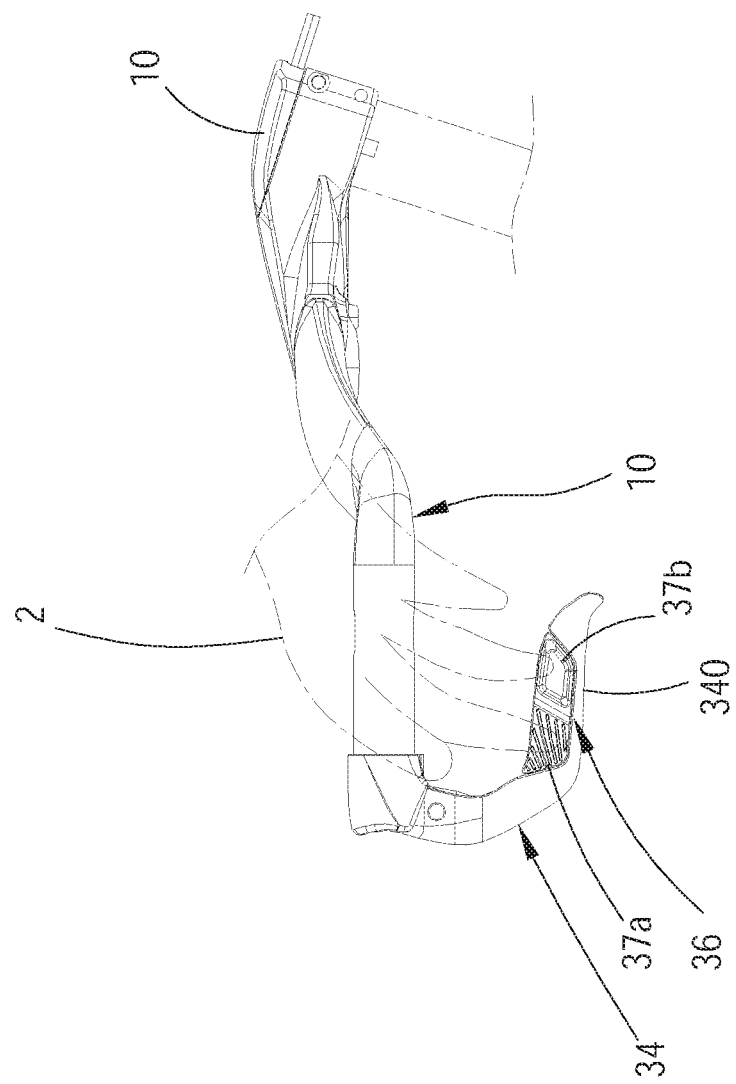
FIG. 5 is a side view which illustrates a rider operating the integrated handlebar of the first embodiment.

Whereby, with the aforementioned design, the rider could control the first operation part 37a and the second operation part 37b with his fingers. As illustrated in FIG. 5, when the rider holds the handlebar 10 with his hand 2 and triggers the first operation part 37a or the second operation part 37b with his fingers to control the operation member 37, the bottom plate 362 would be driven by the operation member 37 and moving pivotally corresponding to the base portion 361, and thereby the relative button 36c on the protrusion 36a of the base portion 361 would pass through the O-ring 36d and the through hole 36f then abuts against the sealing pad 363, so as to make the corresponding contact portion 36h of the circuit board 364 be triggered by the protrusion portion 36g of the sealing pad 363. Therefore, the contact portion 36h of the circuit board 364 sends out an electronic signal to a corresponding electronic component on the bicycle. The aforementioned electronic device includes electronic components, such as an electronic derailleur system, an electronic seat post, a power motor or an electronic suspension system, but it is not limited thereto.

In other words, when the first operation part 37a is controlled by the rider to trigger the circuit board 364 of the electronic controller 36, the circuit board 364 would output an electronic signal for controlling the electronic component to execute a first action. On the other hand, when the second operation part 37b is controlled by the rider to trigger the circuit board 364, the circuit board 364 would output an electronic signal for controlling the electronic component to execute a second action, which is different from the first action. More detail, when the electronic component is an electronic derailleur system as an example, the first action and the second action could be an upshifting or a downshifting movement for the electronic derailleur system, respectively. However, when other types of electronic components are adopted, the first action and the second action are not limited to the examples mentioned above.

In this way, by utilizing the design of the integrated handlebar 100 and the integrated control device 30 of the present disclosure, the rider could touch or trigger the electronic controller 36 disposed on the brake lever 34 with his fingers when holding the handlebar 10 or a portion of the handlebar 10 close to the free end. The integrated control device 30 in the present disclosure is not only ergonomically designed, but also can be smoothly controlled by the rider, by which, the rider could respond to the traffic condition quickly. Moreover, the integrated control device 30 is suitable for the rider to use his middle finger and ring finger to control the electronic controller 36 specially.

Furthermore, the first operation part 37a and the second operation part 37b of the operation member 37 face toward a lateral side direction of the bicycle, whereby the rider could control the first operation part 37a or the second operation part 37b with his fingers conveniently when holding on a terminal end of the handlebar 10 with his hands. Referring to FIG. 2, from a side view of the handlebar 10, the brake lever 34 has an exterior edge 340 which is disposed away from the handlebar 10. In general, when the rider controls the brake lever 34, by pulling the exterior edge 340 of the brake lever 34 with his fingers and drives the brake lever 34 to rotate pivotally corresponding to the base 32 to brake. Hence, the operation member 37 of the electronic controller 36 is preferably disposed between the exterior edge 340 and the fixing portion 33, or between the exterior edge 340 and the handlebar 10, and is spaced apart from the exterior edge 340 with a gap. Whereby, the possibility of mis-triggering the electronic controller 36 by the rider is lower, which then improves the accuracy of controlling.

Figure 6:
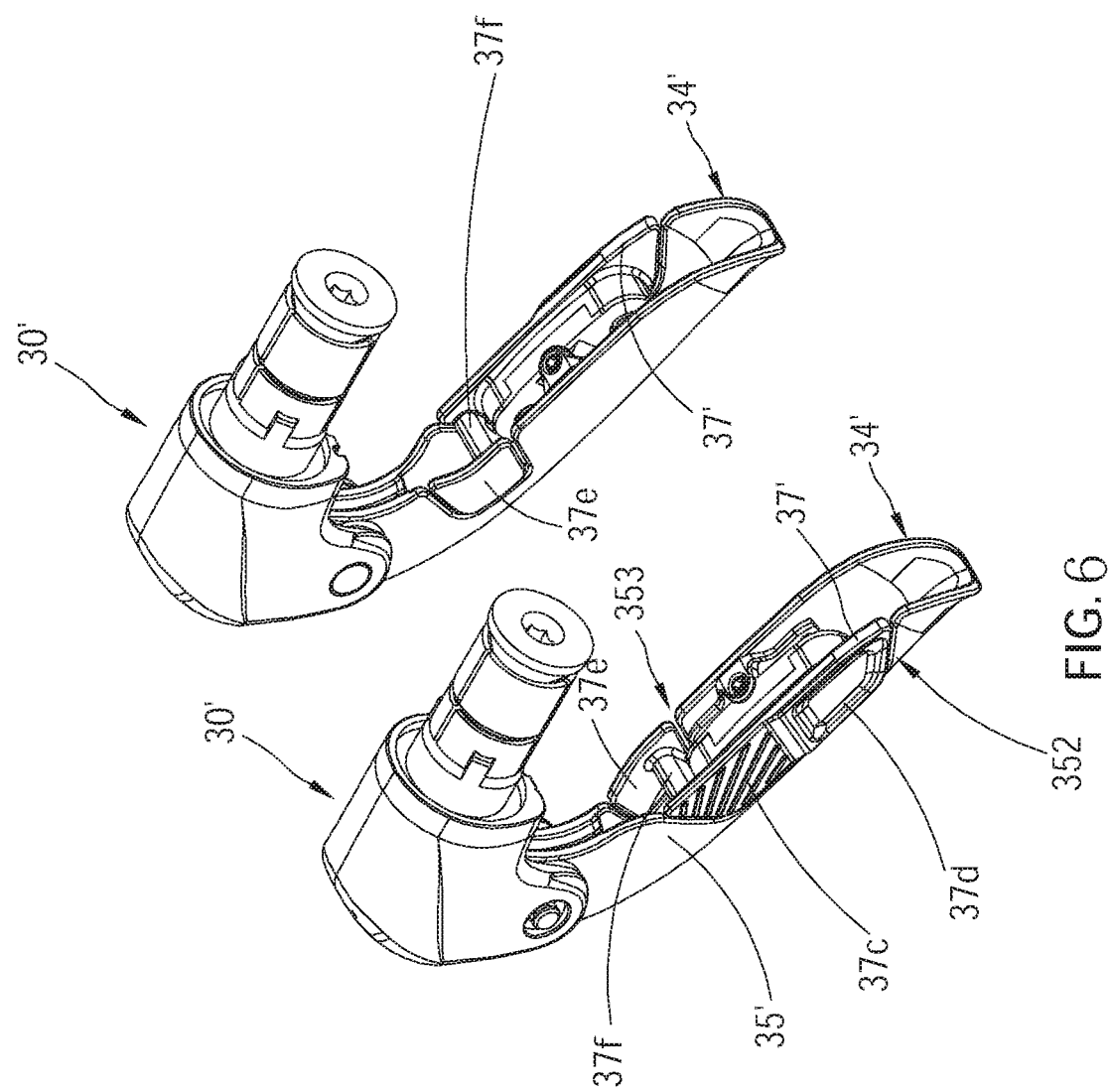
FIG. 6 is a perspective view of an integrated control device of a second embodiment according to the present disclosure.
Figure 7:
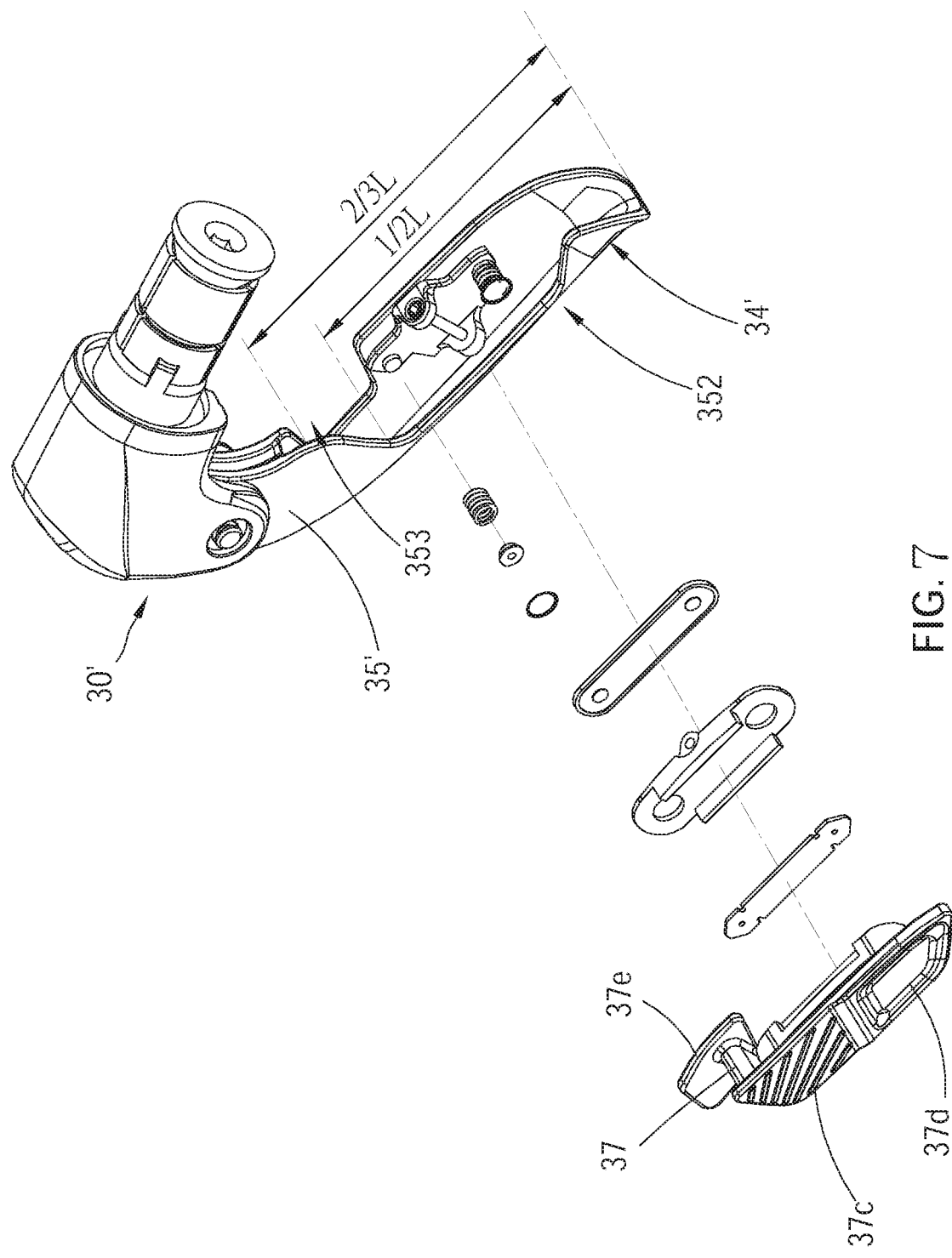
FIG. 7 is a partially exploded view of the integrated control device of the second embodiment.

As shown in FIG. 6 and FIG. 7, an integrated control device 30' of a second embodiment according to the present disclosure includes a structure similar to that of the integrated control device 30 mentioned above. The description of the identical portions of the structure is omitted here. The integrated control device 30' is different from the first embodiment in the mounting portion 35' of the brake lever 34', the mounting portion 35' further includes two recesses 352, 353 which are disposed at two opposite sides thereof. Wherein, the first recess 352 is identical with that of the first embodiment and is disposed at a distance of ½ length of the brake lever 34' from the rear end, i.e., it is shown as a range of ½ L in FIG. 7, while the second recess 353 on the opposite side is disposed at a distance of ⅔ length of the brake lever 34' from the rear end, i.e., it is shown as a range of ⅔ L in FIG. 7. The operation member 37' of the integrated control device 30' further includes a third operation part 37e apart from the first operation part 37c and the second operation part 37d, wherein the third operation part 37e is connected to the first operation part 37c via a bar 37f, more specifically, the bar 37f connected with both of the inner surfaces of the third operation part 37e and the first operation part 37c. Furthermore, the first operation part 37c and the second operation part 37d are both positioned in the first recess 352, while the third operation part 37e is installed in the second recess 353.

In this way, when the rider triggers the third operation part 37e with one of his fingers, the third operation part 37e would drive the first operation part 37c and the second operation part 37d to move simultaneously. Thereby the circuit board 364 is being triggered to generate an electric signal correspondingly. In the current embodiment, since the bar 37f is connected to both of the inner surfaces of the first operation part 37c and the third operation part 37e, when the third operation part 37e is being triggered, the operation member 37' could be levered to trigger the contact portion 36h of the circuit board 364 corresponding to the second operation part 37d, so as to generate an electronic signal.

It shall be noted that the operation member not only could be integrally formed, such as the operation members 37, 37' mentioned above, the operation member of the present disclosure also could be constituted by a plurality of independent components in other embodiments, whereby the first operation part, the second operation part, and the third operation part could be disposed on different components respectively. Moreover, the electronic controller could be further designed and utilized with a basic structure of a rocker switch circuit, a push button switch or other types of switch circuits, and is not limited to the configuration and the amount of the components as mentioned above.

Whereby, the third operation part is not connected and not operated together with the first operation part or the second operation part. When the third operation part is triggered by the rider, the electronic controller would output an electronic signal for actuating a third action to control the electronic component, wherein the third action could be identical with or different from the first action or the second action so as to perform flexible operation. For instance, when the electronic component is an electronically adjustable seat tube as an example, the first action generated by triggering the first operation part could be lifting the seat tube, the second action generated by triggering the second operation part could be lowering the seat tube, and the third action generated by triggering the third operation part could be locking the height of the seat tube. The above examples are exemplified only, in practice, the operation and the corresponding action may be varied depending on its requirement and are not limited thereto.

Figure 8:
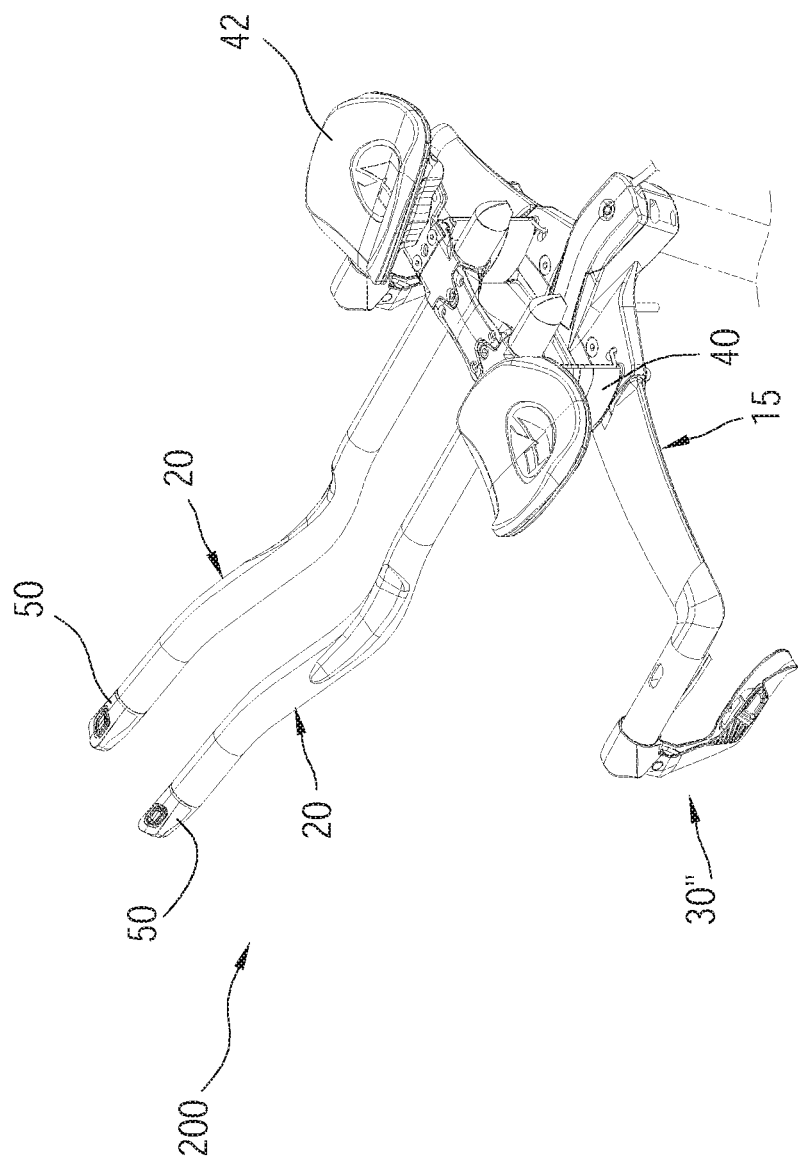
FIG. 8 is a perspective view of an integrated handlebar of a third embodiment according to the present disclosure.
Figure 9A:
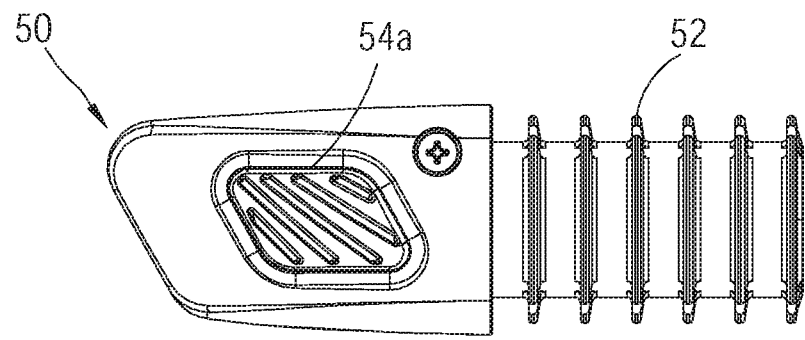
FIG. 9A to 9C are schematic views of the auxiliary controller of the third embodiment from different angles.
Figure 9B:
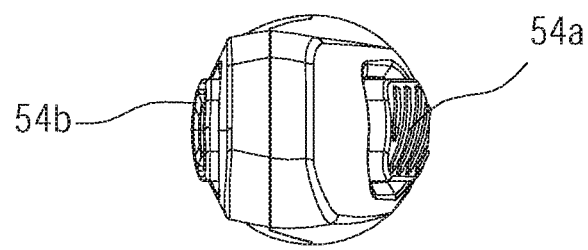
Figure 9C:
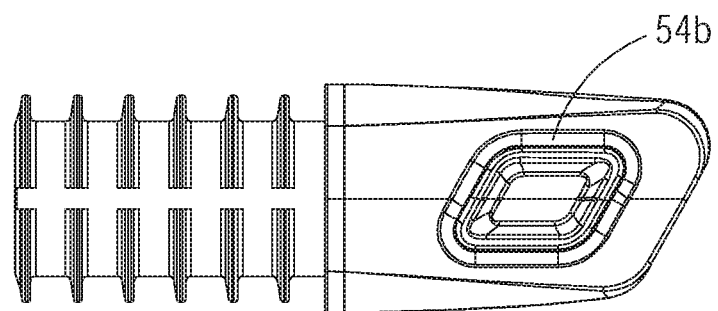

Furthermore, as illustrated in FIG. 8, an integrated handlebar of a third embodiment according to the present disclosure includes a handlebar, two integrated control devices 30" and two auxiliary controllers 50. Wherein, the handlebar includes a main handlebar 15 and two auxiliary handlebars 20. The main handlebar 15 and the integrated control device 30" are identical with those of the first embodiment, and therefore the related descriptions are omitted here. The integrated handlebar 200 of the third embodiment is different from those of the aforementioned embodiments in that the integrated handlebar 200 further includes two auxiliary handlebars 20 and two auxiliary controllers 50.

To facilitate bicycle riding, the two auxiliary handlebars 20 are disposed on a middle section of the main handlebar 15 and arranged at two lateral sides of the stem respectively. The two auxiliary handlebars 20 extend forwardly with respect to the bicycle, which enables the rider to hold and control a riding direction of the bicycle. The integrated handlebar 100 further includes a bridge 40 adapted to be installed with the two auxiliary handlebars 20. Additionally, on each side of the bridge 40 is disposed with a pad 42, whereby the rider could lean over to rest his arms or elbows on the two pads 42 to have his upper body weight being received thereon and reduce the weight loading on his waist in a long-time riding. Meanwhile, it also enables the rider to lower the height of his upper body, which could reduce the wind resistance in the riding journey, and thereby to save his energy and increase the riding speed.

As illustrated in FIG. 8 and FIG. 9A to 9C, the two auxiliary controllers 50 are respectively installed on the free ends of the two auxiliary handlebars 20. Each of the two auxiliary controllers 50 includes an engaging portion 52, two operation elements 54a, 54b and an electronic controller (not shown). The engaging portion 52 and the two operation elements 54a, 54b are respectively arranged on two opposite ends of the auxiliary controller 50, wherein the engaging portion 52 is adapted to be engaged with the free end of the auxiliary handlebar 20 to install the auxiliary controller 50 on the auxiliary handlebar 20, and the two operation elements 54a, 54b are located on a front end of the auxiliary controller 50 which faces forwardly with respect to the bicycle.

When the two operation elements 54a, 54b are triggered by the rider, the electronic controller would be triggered to output an electronic signal to control an electronic component of the bicycle. In the current embodiment, the two operation elements 54a, 54b are respectively arranged on two opposite sides of the front end, wherein the operation element 54a faces toward a top side of the bicycle, while the operation element 54b faces toward a downside of the bicycle. In this way, when the rider holds the auxiliary handlebar 20, it is convenient for the rider to trigger the operation element 54a with one of his fingers (e.g. thumb) to trigger an electronic signal for actuating a first action or a second action, or to trigger the operation element 54b with another one of his fingers (e.g. forefinger or middle finger) to trigger an electronic signal for actuating a second action or a first action. In an alternative embodiment, the installation direction of the auxiliary controller 50 could be adjusted according to the rider's habit to make the operation elements 54a, 54b face toward other directions. Meanwhile, the number of the operation elements could be one, three, or more than three, and is not limited to the above embodiments.

In addition, the two integrated control devices 30" are not limited to be installed on the two main handlebars 15. For instance, in one embodiment, the two integrated control devices 30" could be installed on the free ends of the two auxiliary handlebars 20, whereby the rider could control the two integrated control devices 30" conveniently when riding the bicycle with resting his arms or elbows on the two pads 42 and holding the two auxiliary handlebars 20 with his hands, so as to control the brake and the electronic control device of the bicycle. Besides, the above description is not only related to the integrated control device 30" of this embodiment, but is also applicable to the integrated control devices 30, 30' of the first embodiment and the second embodiment.

Furthermore, as illustrated in FIG. 10, an integrated handlebar 300 of a fourth embodiment according to the present disclosure is designed based on the configuration of the integrated handlebar 200 of the aforementioned embodiments, wherein it is particular that the integrated handlebar 300 includes four integrated control devices 30" and is without the auxiliary controller 50 of the aforementioned embodiment. Wherein, two of the four integrated control devices 30" are installed on the main handlebar 15 respectively, each of which is engaged with one of the two free ends of the main handlebar 15 with a base thereof, while the other two integrated control devices 30" are installed on the two auxiliary handlebars 20 respectively, each of which is engaged with one of the two free ends of the auxiliary handlebars 20 with a base thereof. By way of the above design, when the rider changes his riding posture, such as changing from holding on the main handlebar 15 to the auxiliary handlebars 20, or changing from holding on the auxiliary handlebars 20 to the main handlebar 15, the rider still can control the brake and the derailleur flexibly and conveniently, which is not only ergonomically designed, but also can be smoothly controlled by the rider.

Figure 12:
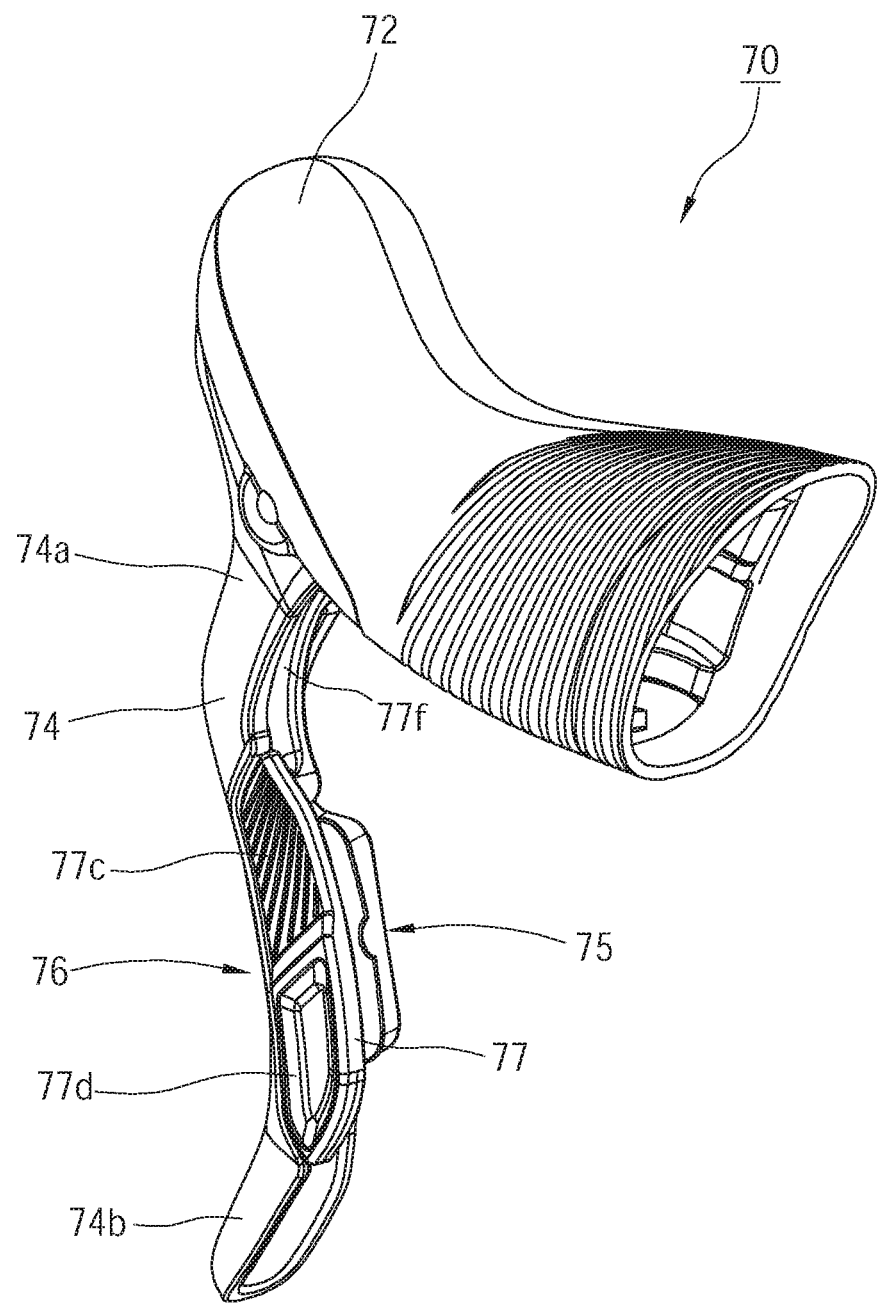
FIG. 12 is a perspective view of an integrated control device of the fifth embodiment according the present disclosure.

As illustrated in FIG. 11 and FIG. 12, an integrated handlebar 500 of a fifth embodiment according to the present disclosure is adapted to be installed on a road bike (now shown). The integrated handlebar 500 includes a handlebar 60 and two integrated control devices 70. The handlebar 60 comprises a top portion 62 and two drop portions 64. The top portion 62 extends laterally. The two drop portions 64 have a curved shape and integrally connect with two ends of the top portion 62.

The integrated control device 70 also includes a base 72, a brake lever 74 and an electronic controller 76. The base 72 is mounted on one of the drop portions 64 of the handlebar 60. The brake lever 74 has a front end 74a and a rear end 74b. The front end 74a is pivotally connected with the base 72 to allow the brake lever 74 to pivot relative to the base 72. The brake lever 74 includes a mounting portion 75, which is located between the rear end 74b and a site not greater than ¾ length of the brake lever 74 from the rear end 74b and not directly on the rear end 74b. The electronic controller 76 is disposed at the mounting portion 75 of the brake lever 74 and has an operation member 77. The operation member 77 is located in the mounting portion 75. The operation member 77 is integrally formed and has three operation parts 77c, 77d, 77e. The three operation parts 77c, 77d, 77e are adapted to be triggered by fingers of a rider to control the operation member 77 so as to make the electronic controller 76 output an electronic signal to an electronic component and actuate the electronic component. The three operation parts 77c, 77d, 77e are respectively a first operation part 77c, a second operation part 77d, and a third operation part 77e. When the first operation part 77c is triggered by the rider, the electronic controller 76 would output the electronic signal for actuating a first action of the electronic component. When the second operation part 77d is triggered by the rider, the electronic controller 76 would output the electronic signal for actuating a second action of the electronic component. The second action is different from the first action. The third operation part 77e is connected to the first operation part 77c with via a bar 77f. When the third operation part 77e is triggered by the rider, the electronic controller 76 would output the electronic signal for actuating a third action of the electronic component. Under the circumstance, the third operation part 77e also drive the first operation part 77c and the second operation part 77d to move simultaneously. The third action is identical to the first action or the second action.

The first operation part 77c is located on the mounting portion 75 at a distance of ½ length of the brake lever 74 from the rear end 74b. The third operation part 77e is closer to the front end 74a than the first operation part 77c. The first operation part 77c and the third operation part 77e are located at two opposite sides of the brake lever 74. The second operation part 77d is located on the mounting portion 75 adjacent to the rear end 74b of the brake lever 74.

In other applications, the integrated control device could be installed on a single handlebar, and it not necessary to be installed with at least two integrated control devices. Meanwhile, the locations of each of the operation members are not limited to the embodiments exemplified above, as long as each of the operation members is located at a distance not greater than ¾ length of the brake lever from the rear end, it would match the ergonomics design and provide better control feeling. It must be pointed out that the embodiments described above are only some embodiments of the present disclosure. All equivalent structures which employ the concepts disclosed in this specification and the appended claims should fall within the scope of the present disclosure.

What is claimed is:

1. An integrated control device for a bicycle, adapted to be installed on a handlebar of the bicycle, comprising:
   a base, adapted to be mounted on the handlebar;
   a brake lever, having a front end and a rear end, wherein the front end of the brake lever is pivotally connected with the base to allow the brake lever to pivot relative to the base; the brake lever has a mounting portion, being located between the rear end and a site not greater than ¾ length of the brake lever from the rear end and not on the rear end wherein the brake lever pivots relative to the handlebar substantially in one direction only; and
   an electronic controller, having an operation member and being disposed at the mounting portion of the brake lever, wherein the operation member is located in the mounting portion and has three operation parts being adapted to be triggered by fingers of a rider to control the operation member so as to make the electronic controller output an electronic signal to an electronic component and actuate the electronic component;
   wherein the three operation parts are respectively a first operation part, a second operation part, and a third operation part; when the first operation part is triggered by the rider, the electronic controller outputs the electronic signal for actuating a first action of the electronic component; when the second operation part is triggered by the rider, the electronic controller outputs the electronic signal for actuating a second action of the electronic component, wherein the second action is different from the first action; when the third operation part is triggered by the rider, the electronic controller outputs the electronic signal for actuating a third action of the electronic component, wherein the third operation part is connected to and processed together with the first operation part or the second operation part, thereby enabling the third operation part to drive the first operation part or the second operation part simultaneously when the third operation part is triggered by the rider; the third action is identical to the first action or the second action.

2. The integrated control device of claim 1, wherein the first operation part, the second operation part, and the third operation part are integrally formed.

3. The integrated control device of claim 1, wherein the first operation part is located on the mounting portion at a distance of ½ length of the brake lever from the rear end, and the second operation part is located on the mounting portion adjacent to the rear end of the brake lever.

4. The integrated control device of claim 1, wherein the third operation part is closer to the front end than the first operation part, and the first operation part and the third operation part are located at two opposite sides of the brake lever.

5. An integrated handlebar for a bicycle, comprising:
   a handlebar; and
   at least one integrated control device, including:
   a base, mounted on the handlebar;
      a brake lever, having a front end and a rear end, wherein the front end of the brake lever is pivotally connected with the base to allow the brake lever to pivot relative to the base; the brake lever has an mounting portion, being located between the rear end and a site not greater than ¾ length of the brake lever from the rear end and not on the rear end wherein the brake lever pivots relative to the handlebar substantially in one direction only; and
      an electronic controller, having an operation member and being disposed at the mounting portion of the brake lever, wherein the operation member is located in the mounting portion and has three operation parts being adapted to be triggered by fingers of a rider to control the operation member so as to make the electronic controller output an electronic signal to an electronic component and actuate the electronic component;
      wherein the three operation parts are respectively a first operation part, a second operation part, and a third operation part; when the first operation part is triggered by the rider, the electronic controller outputs the electronic signal for actuating a first action of the electronic component; when the second operation part is triggered by the rider, the electronic controller outputs the electronic signal for actuating a second action of the electronic component, wherein the second action is different from the first action; when the third operation part is triggered by the rider, the electronic controller outputs the electronic signal for actuating a third action of the electronic component, wherein the third operation part is connected to and processed together with the first operation part or the second operation part, thereby enabling the third operation part to drive the first operation part or the second operation part simultaneously when the third operation part is triggered by the rider; the third action is identical to the first action or the second action.

6. The integrated handlebar for a bicycle of claim 5 wherein the first operation part and the third operation part are located at two opposite sides of the brake lever.

7. The integrated handlebar for a bicycle of claim 5, wherein the first operation part, the second operation part, and the third operation part are integrally formed.

8. The integrated handlebar for a bicycle of claim 5, wherein the first operation part is located on the mounting portion at a distance of ½ length of the brake lever from the rear end, and the second operation part is located on the mounting portion adjacent to the rear end of the brake lever, the third operation part is closer to the front end than the first operation part.

9. The integrated handlebar for a bicycle of claim 8, wherein the first operation part and the third operation part are located at two opposite sides of the brake lever.

10. The integrated handlebar for a bicycle of claim 5, wherein the handlebar comprises a top portion and two drop portions integrally connecting with two ends of the top portion respectively, the base of the integrated control device is mounted on one of the drop portions of the handlebar.

\* \* \* \* \*